(No Model.) 5 Sheets—Sheet 1.

C. M. ALLEN.
RANGE FINDER.

No. 484,726. Patented Oct. 18, 1892.

Witnesses,
J. H. Rouse
H. F. Ascheck

Inventor,
Charles M. Allen
By Dewey & Co.
Attys (No Model.) 5 Sheets—Sheet 2.
C. M. ALLEN.
RANGE FINDER.

No. 484,726. Patented Oct. 18, 1892.

Witnesses,
J. H. Rouse
H. F. Ascheck

Inventor,
Charles M. Allen
By Dewey & Co.
Attys (No Model.)  5 Sheets—Sheet 4.

C. M. ALLEN.
RANGE FINDER.

No. 484,726.  Patented Oct. 18, 1892.

Witnesses,

Inventor,
Charles M. Allen (No Model.)

5 Sheets—Sheet 5.

C. M. ALLEN.
RANGE FINDER.

No. 484,726.

Patented Oct. 18, 1892.

WITNESSES
Thomas Rout, Jr.
Chapman W. Fowler.

INVENTOR
Charles M. Allen
By Dewey & Co.
Attorneys

UNITED STATES PATENT OFFICE.

CHARLES M. ALLEN, OF SAN FRANCISCO, CALIFORNIA.

RANGE-FINDER.

SPECIFICATION forming part of Letters Patent No. 484,726, dated October 18, 1892.

Application filed October 2, 1891. Serial No. 407,563. (No model.)

*To all whom it may concern:*

Be it known that I, CHARLES M. ALLEN, a citizen of the United States, residing in the city and county of San Francisco, State of California, have invented an Improvement in Range-Finders; and I hereby declare the following to be a full, clear, and exact description of the same.

My invention relates to an apparatus which I call a "range-finder."

It consists of a camera obscura with perspective scales, plotting-chart, and trajectory scale, whereby the distances of points over a level or other surface may be accurately determined.

Figure 1:
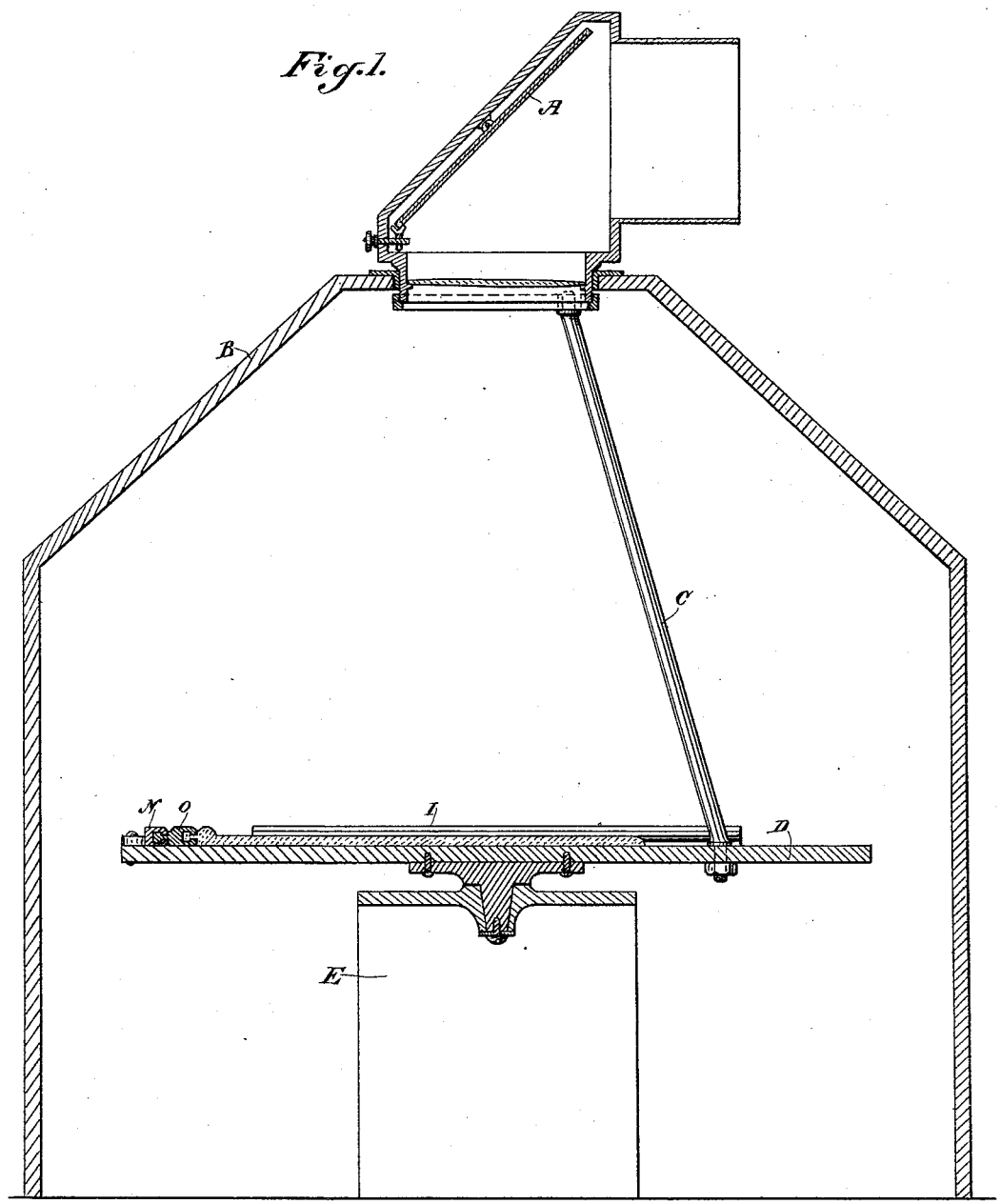
Figure 2:
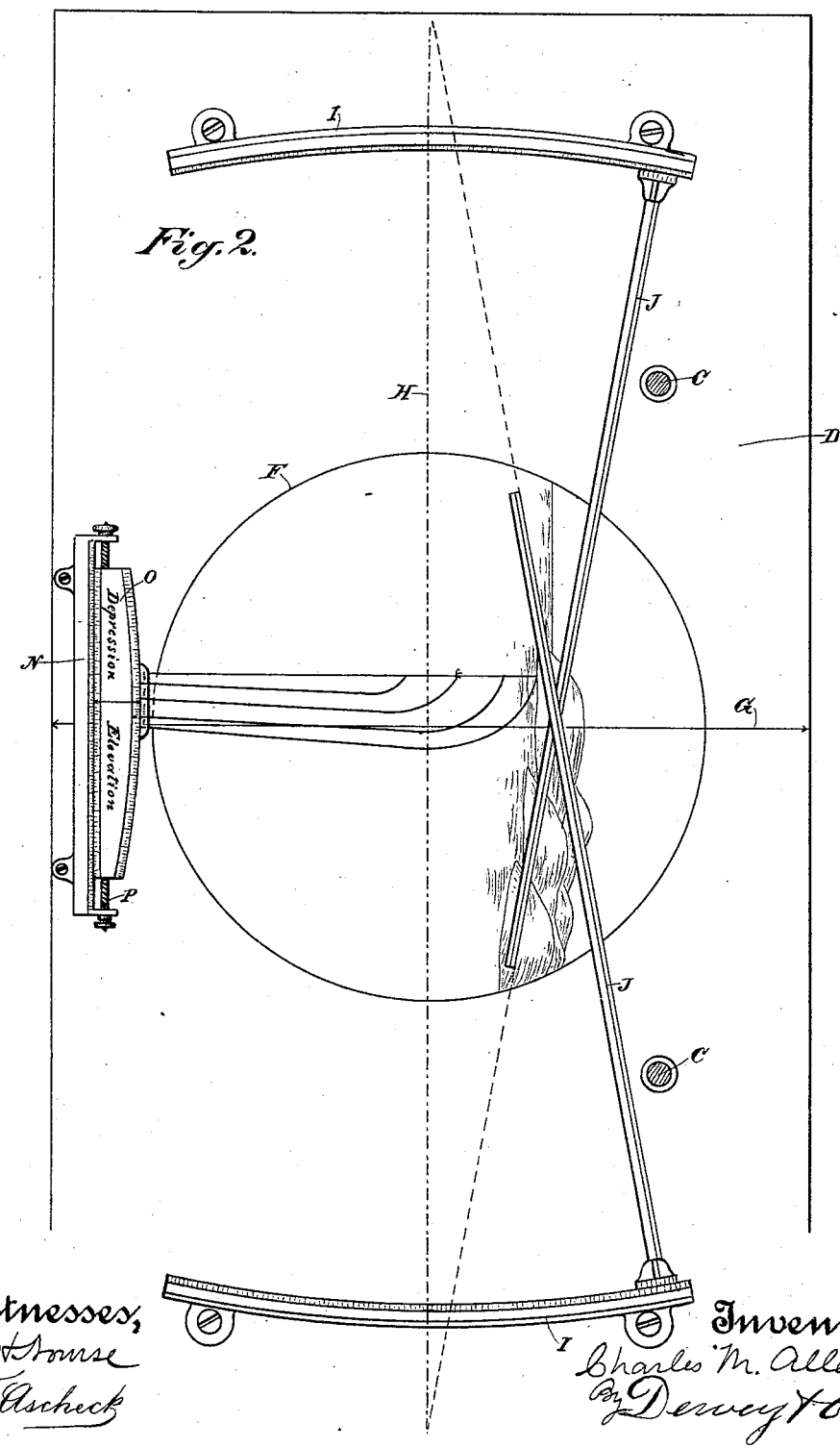
Figure 3:
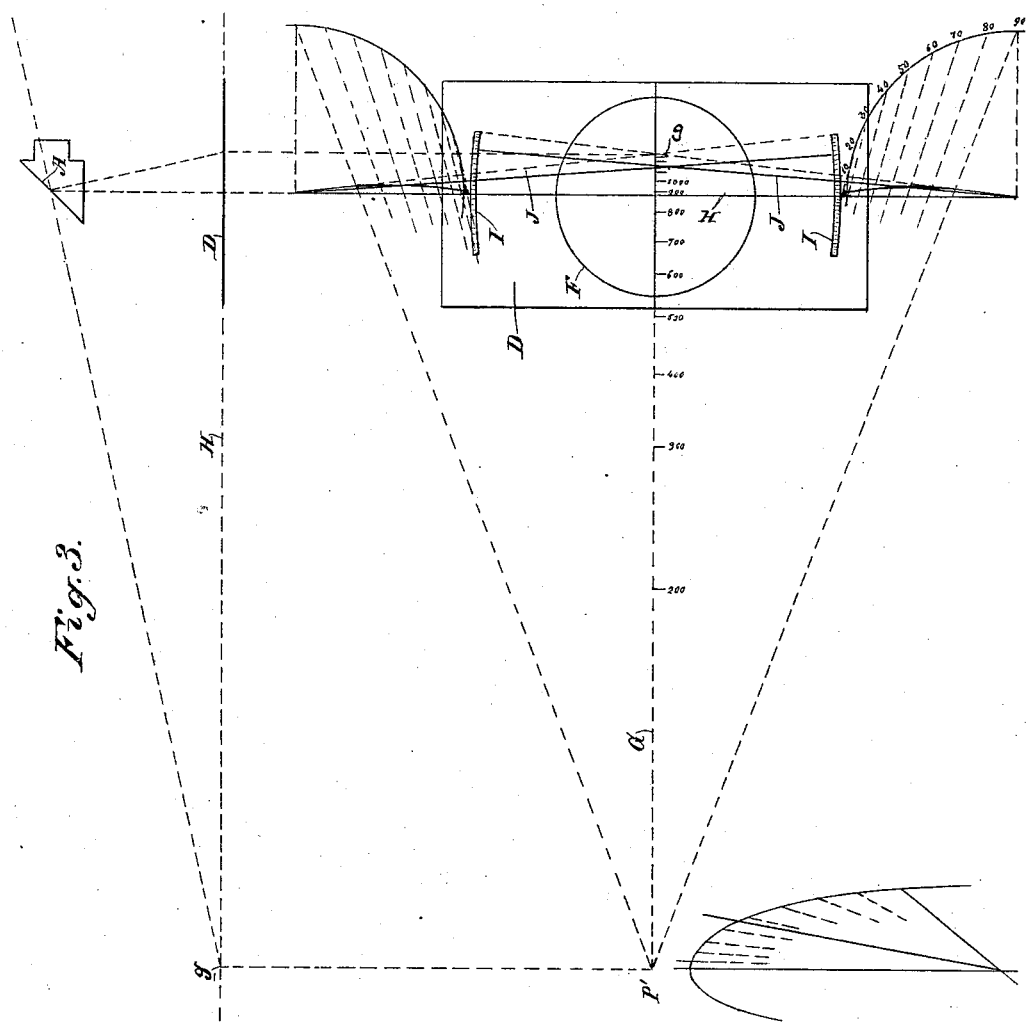
Figure 4:
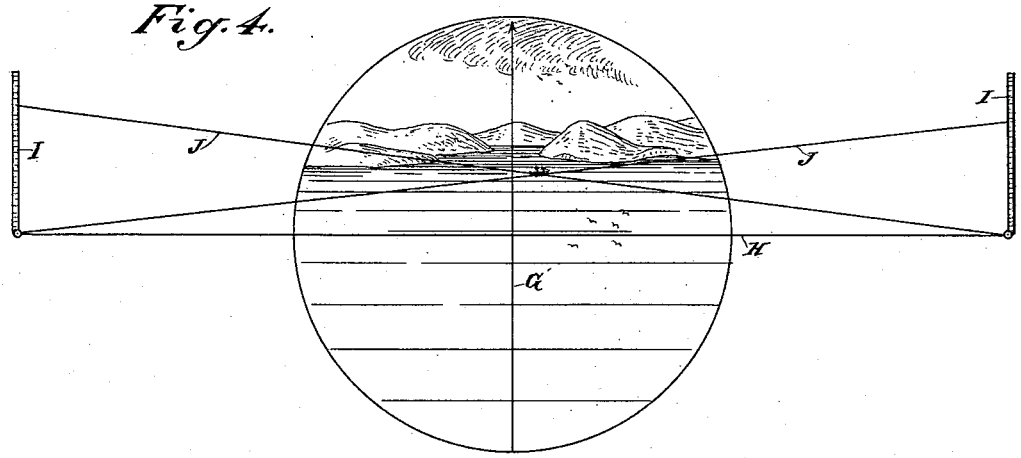
Figure 5:
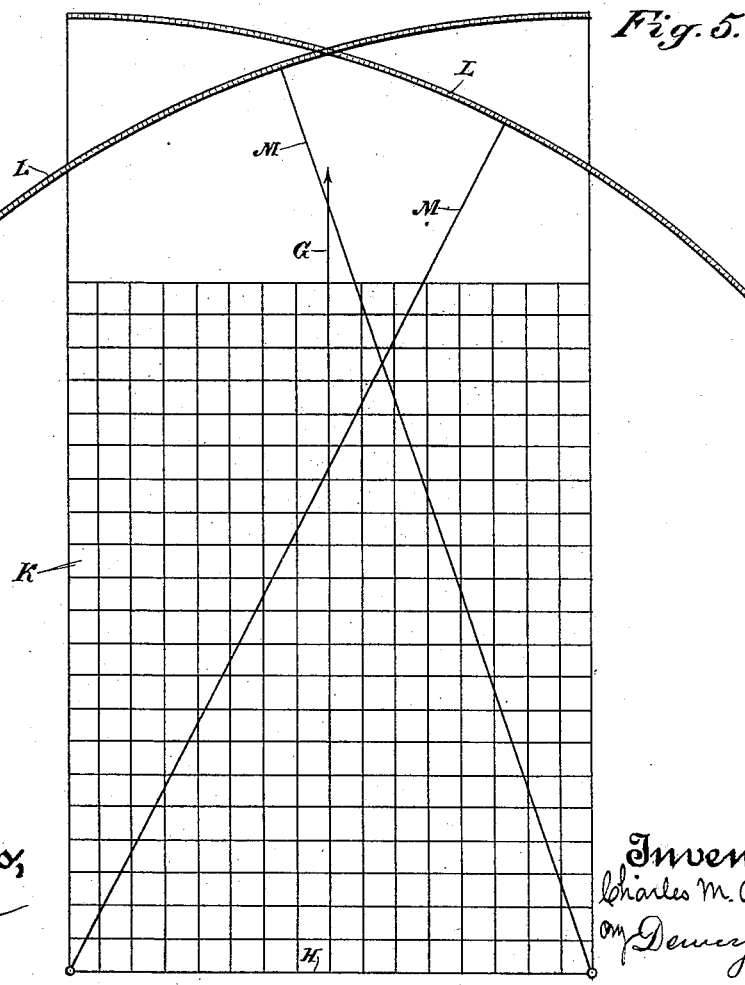
Figure 6:
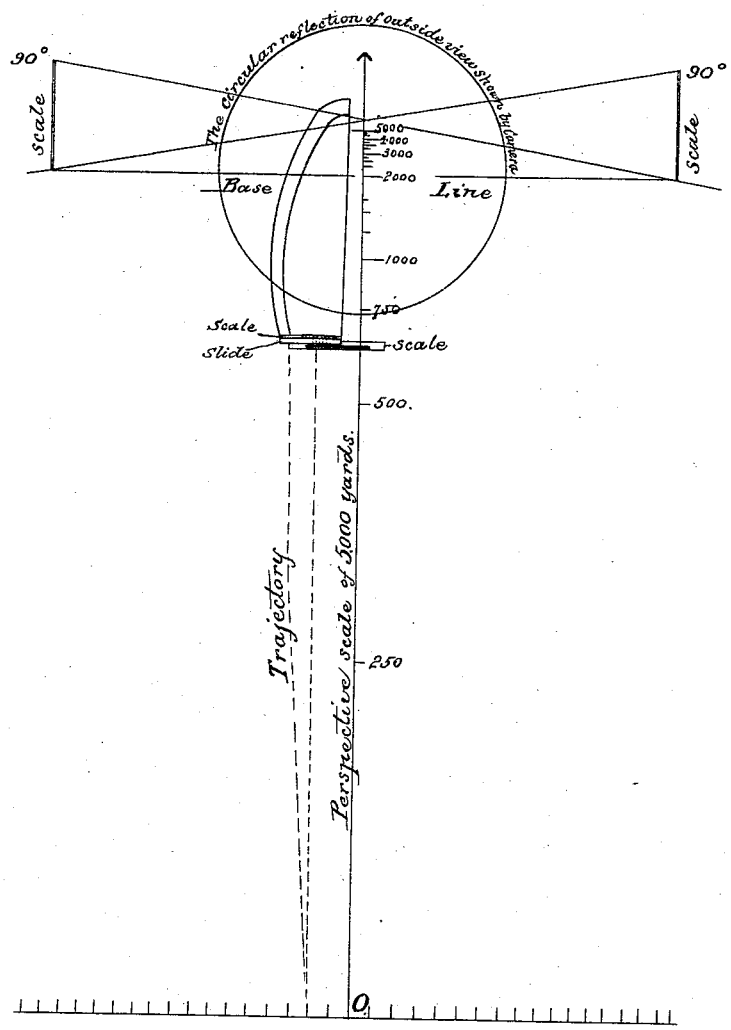

Referring to the accompanying drawings for a more complete explanation of my invention, Figure 1 is a vertical section taken through the camera and the receiving-table. Fig. 2 is a plan view of the receiving-table and appurtenances. Fig. 3 is a view showing the manner of laying out the base-line and scales. Fig. 4 is the reflected view. Fig. 5 is the plotting-chart and angle-scales. Fig. 6 is a diagram to be referred to.

A is the reflecting-mirror of a camera obscura of the usual or any suitable construction, mounted upon the top of an inclosed structure B, from which the light can be wholly excluded, and by means of the angularly-placed reflector and a lens, with an approximately-vertical axis arranged with reference thereto, a reflection of the outside view may be projected upon the table D, situated in the inclosed structure and directly beneath the lens of the camera. This table is mounted upon a stationary pier E with a vertical swivel-pin, the axis of which is in line with the axis of the lens above, and about this the table may be turned to face any point of the horizon.

C C are legs or standards extending from the table up to the camera, which is supported upon these legs, so that when the table is turned the camera partakes of all the movements given to the table.

F in the plan view is the circle within which the landscape toward which the camera is pointed is projected.

G is a line through the center of this reflection which represents the line of observation and lies in the direction in which the camera faces.

H is the base-line which is drawn across this line of observation at right angles with it. This base-line represents a known distance and measurements, which are determined in the following manner: From the vanishing-point *g* upon the line of observation (by which I mean the point where lines drawn parallel to the line of observation would seem to meet) is projected a line through one of the observation points or point upon one of the said parallel lines on the base-line and continued until it intersects with a line drawn from the point at right angles to the line of observation which is in full measurement, and the intersection of these lines will determine the length of the base-line. The base-line is represented in a reflected position—that is, occupying a position in the reflected view that a reflection from a base-line would occupy if upon the water at the desired position. In perspective view parallel lines will seem to meet at infinite distances. If the base-line is to be three thousand yards long, I draw upon the perspective view the appearance two parallel lines will have if three thousand yards apart. Between these lines I draw the base-lines at the required position out upon the scale of perspective distances two thousand yards, as shown in drawings. Angles of ninety degrees from the ends of the base-line will meet at infinite distances in perspective. The scales upon each side of the reflected view are graduated to perspective angles from the opposite points upon the base-line. The base-line would have the same value in length if placed at any other position between the two angles of ninety degrees shown. The trajectory scale is a scale of trajectory on the same perspective of diminishing distances, and as only a portion of the scale is necessary to be used it is shortened to save space and constructed so as to partake of the same movements as if full length. The trajectory begins at the point 0 (see Fig. 6) or the beginning of the scale of perspective. The scale shown, and to which the trajectory scale is attached, give to the trajectory scale the same movements as if it were pivoted at 0. If the gun for which the trajectory is used is one hundred feet above the level of the water, the scale graduated to feet in elevation is used, and by moving the same till the reading of "100 feet" is shown above the center line it will place the trajectory in the proper position. The center line in this case is used as a level instead of using the trajectory vertically and cutting through the receiver of reflections. Any object reflected upon this line is in proper position for measurement, and by passing the trajectory through the reflection a reading will be given upon the trajectory scale of the angle for elevation or depression in firing the gun.

I I are curved scales forming arcs of circles, the radii of which are drawn from the terminals of the base-line, and J J are straight-edges, having one end of each fixed to a slide which moves accurately over the scale I. These straight-edges extend across the reflected picture upon the table, and it will be manifest that in whatever position they may be moved to upon their arcs I they will stand in line toward the terminals of the base-line, which may be imaginary points at a considerable distance away from the apparatus. These lines and points are in a reflected position and indicate known places and measurements. They are known measurements because they have been previously computed; but as the lines and points are in perspective they can but indicate them and not shown them in full.

The scales of degrees I are enlargements of perspective angles upon the surface of the picture which are projected from the observing-point on the base-line, but which by reason of their foreshortened condition would be difficult to use accurately. These scales are to have a graduation of distances for angles—as, 85° 15' equals two thousand nine hundred yards, &c.; 83° 30' equals fifteen hundred yards, &c.—to be used when measuring from one observation point, or when objects appear upon the line of observation.

The base-line shown in the perspective or reflected view need not have its terminals or points of observation within the circle of reflection, and instead of having a table large enough to contain these points arcs may be made with these points as radii, and by sliding the straight-edge over these arcs they will partake of the same movements as if pivoted at these points. The graduation of the scales upon the receiver of the reflection is a graduation of degrees, minutes, and seconds.

In perspective a circle seen upon the water at a distance would be seen as an ellipse and would be reflected as an ellipse by the camera. The degrees, minutes, and seconds would also be shown in perspective and would not be uniform as in place.

The operation will then be as follows: If it be desired to find the position of any object at a distance over the level surface, the opening of the camera is turned in that direction, the table being moved simultaneously, and the reflection of the object falls upon the table within the circle F. The straight-edges J are then moved upon the curved scales I until their point of intersection crosses the position of the object in the reflection, and by means of the readings upon the scales I the point is located.

K is the plotting-chart, upon which all the distances are laid down to a scale, and upon which is represented the true length and position of the base-line.

L L are scales which correspond in plan with the perspective scales I.

From the observing-points represented in plan upon the plotting-chart K are pivoted the straight-edges M, which are designed to move about their pivotal points and over the scales L. These straight-edges are now moved over the scales L until they coincide with the readings which were shown upon the perspective-arcs I of the receiving-table, and their point of intersection locates upon the chart exactly the position of the object which has been pictured upon the receiving-table, and its distance may then be accurately taken. This is especially valuable in finding the range of guns or the points at which shots strike in practice, and for many other similar purposes.

For rapid firing upon moving objects I employ a scale N, which is fixed upon the table. This scale is graduated to represent feet in elevation above the level of the surface of the water. In this case the line of observation represents the level and the scale is graduated from this line. A second scale O is movable upon the scale N by means of a screw P, and it has a curved edge the radius of which is the distance to the point P' on the line G. On this curved edge are graduations of degrees in elevation and depression from that point, (by which I mean the scale for trajectories which are figured out for every gun,) the weight of projectiles, muzzle, velocity, and elevation being known. A transparent plate or scale containing the trajection of the guns to be used, marked upon it in a reduced scale, is fitted to move upon the convex edge of the scale O as if from the point P', Fig. 3. This transparent plate or scale is moved over the curved scale O until the line of trajection of the gun to be used intersects the object reflected upon the table. From this the exact elevation or depression of the gun is then determined, so that when the gun is fired the projectile will strike the point desired.

This range-finder is a single-observing direct-reading instrument. It may be used as a general observing-station for batteries and vessels within a radius of several miles. Distances to moving, as well as stationary objects, may be taken by it, and the speed and direction of vessels may also be taken. The position of torpedoes or mines may be located upon the reflection and they may be fired when the moving vessel or object has reached a point above these positions.

The operation of measuring with this device can be completed by one person in a half-minute's time at most.

Having thus described my invention, what I claim as new, and desire to secure by Letters Patent, is—

1. A range-finder consisting of a camera obscura, a receiving-table with which it is connected, the two being movable about the common vertical axis, scales having a curvature upon radii from the points of observation upon the base-line, and straight-edges connected with slides movable over said curved scales, crossing the surface of reflection upon the table and movable so as to intersect each other at the point where the object to be located is reflected upon the surface, substantially as herein described.

2. A range-finder consisting of the camera obscura, a receiving-table with which the camera is connected, and a vertical axis common to the two, about which they may be turned to face in any direction, an observation and a base line crossing the surface of reflection at right angles, curved perspective scales fixed upon the table upon each side of the surface of reflection, straight-edges movable over said scales, so as to cross the surface of reflection and intersect each other above the reflection of the desired object, whereby readings may be taken from the two scales, a plotting-chart upon which is represented the true position and length of the base-line, straight-edges pivoted at each of the observing-points on the base-line and movable over its surface, and scales graduated in degrees from these points of observation, said scales being graduated in plan to correspond with the perspective scales of the receiving-table, whereby the position of the object is accurately located upon the chart by the intersection of the straight-edges when the latter are moved to positions upon the scales corresponding with those of the scales of the receiving-table, substantially as herein described.

3. A range-finder consisting of a camera obscura, a receiving-table with which it is connected, so that the two are movable in unison about a common vertical axis, a base and an observation line crossing each other at right angles upon the surface of reflection, a straight scale fixed to the table at one side of the reflected picture, a curved scale with screws by which it is moved and adjusted upon the fixed scale with relation to the line of observation, and a transparent scale fitting the curved scale and adjustable with relation thereto, said scale having the line of trajection of the guns to be used marked upon it, whereby these lines are made to intersect the reflection of the object and its distance ascertained by the readings upon the scale, substantially as herein described.

In witness whereof I have hereunto set my hand.

CHARLES M. ALLEN.

Witnesses:
  S. H. NOURSE,
  H. F. ASCHECK.